Patented Apr. 22, 1930

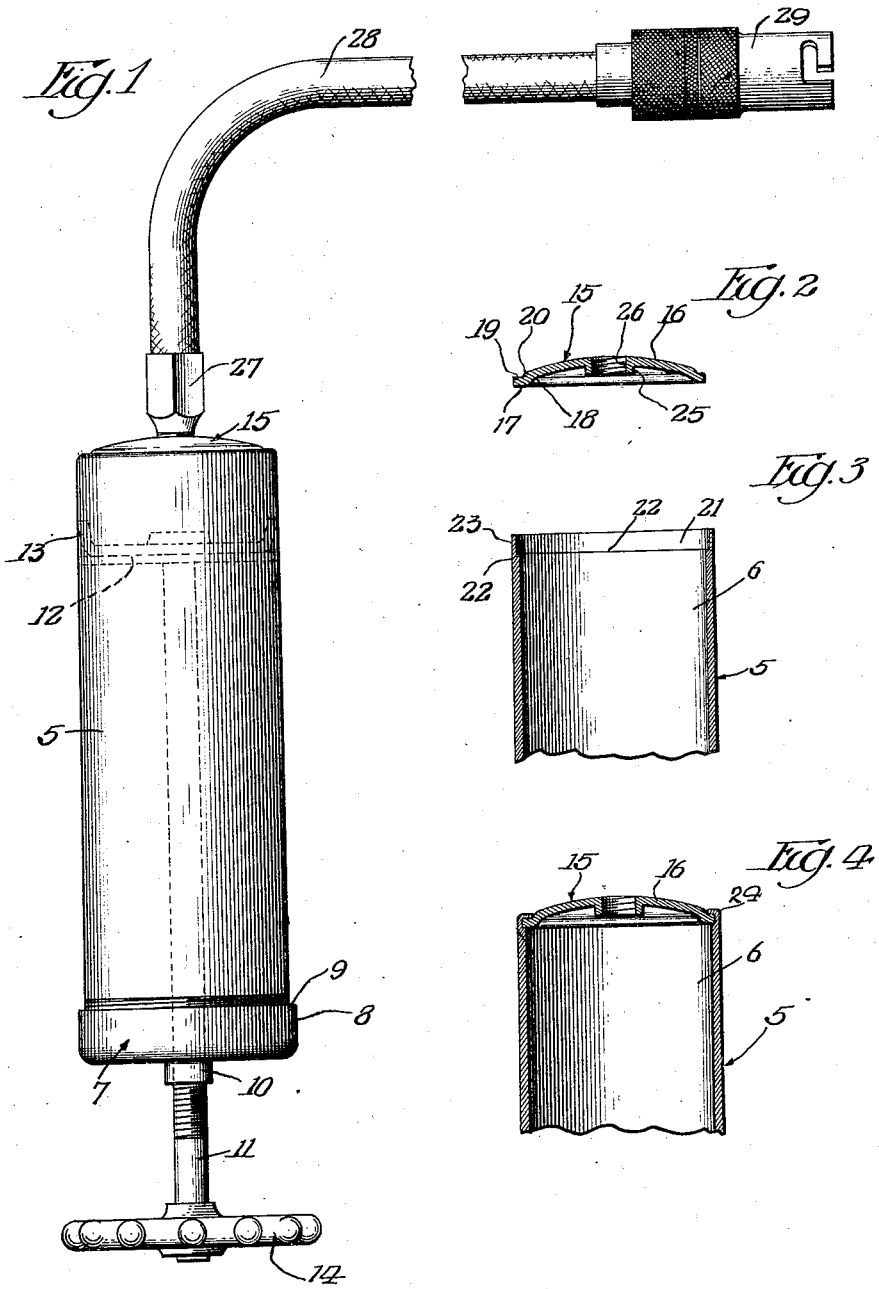

1,755,684

UNITED STATES PATENT OFFICE

WILLARD F. CLARK, OF CHICAGO, ILLINOIS, ASSIGNOR TO MONARCH TOOL & MACHINERY CO., OF CHICAGO, ILLINOIS, A CORPORATION OF ILLINOIS

GREASE PUMP

Application filed June 22, 1928. Serial No. 287,462.

The invention relates to lubricating apparatus and more particularly to grease pumps which are used for supplying grease or other such lubricant under a comparatively high pressure to fittings or cups for bearings.

One object of the present invention is to provide a grease pump of the aforementioned character, in which the head for closing the discharge end of the barrel is held in place between a shoulder and an inrolled wall which together operate to form a seal for effectively preventing leakage or exudation of the grease adjacent the marginal part of the head.

Another object of the invention is the provision of a head for the barrel of a grease pump, which is punched or struck from a single disk of sheet metal and is formed or constructed so as to give the maximum amount of rigidity.

A further object of the invention is to provide a grease pump for use in high pressure lubricating systems, which is of new and improved construction, may be manufactured or fabricated at a comparatively low cost and is efficient in operation.

Other objects of the invention and the various advantages and characteristics of the present construction will be apparent from a consideration of the following detailed description.

The invention consists in the several novel features hereinafter set forth and more particularly defined by the claims at the conclusion hereof.

In the drawing which accompanies and forms a part of this disclosure or specification and in which like numerals of reference denote corresponding parts throughout the several views:

Figure 1 is a side elevational view of a grease pump embodying the invention;

Figure 2 is a sectional view of the sheet metal head for closing the discharge end of the pump;

Figure 3 is a longitudinal section of the pump barrel, showing the same prior to the mounting or connection of the head; and Figure 4 is a sectional view similar to Figure 3, showing the head secured in its operative position between the shoulder and inrolled or beaded over wall of the barrel.

The invention is exemplified in a grease pump which is adapted primarily for use in supplying grease or other such lubricant under high pressure to fittings or cups, and comprises an elongated cylindrical barrel 5. The latter is preferably formed of metal tubing having a comparatively thin wall so that the pump is light and may be manipulated or handled with ease. The interior of the barrel 5 forms a compartment or cylinder 6 for the grease. The end of the barrel through which the lubricant is inserted into the cylinder 6 is normally closed by a head 7. This head is provided with an inwardly extending annular flange 8 which is removably connected to the barrel by a screw thread connection 9. A boss 10 is integrally formed with the central portion of the head 7 and is provided with an internally threaded bore for receiving the externally threaded stem 11 of a piston 12. This piston has secured thereto a leather cup or similar plunger element 13 and is operative during reciprocatory movement thereof caused by relative rotation of the stem and head 7 to force or exude the grease from the cylinder 6. The outer end of the stem 11 is provided with a handle 14 to facilitate the operation of the piston 12.

The discharge end of the barrel 5 is permanently closed by a head 15 which is punched or struck from a circular disk of sheet metal and comprises an outwardly bulged or concavo-convex central portion 16 and a radially extending marginal portion 17. The latter is connected to the concavo-convex central portion 16 by an axially extending or offset portion 18 which results in the formation of an annular recess 19 and a shoulder 20 on the outer face of said head 15. The end of the barrel 5 opposite the removable head 7 is drilled or machined to form a bore 21, which is slightly larger in diameter than that of the cylinder or compartment 6. This bore extends inwardly a comparatively short distance from the edge of the barrel and operates to form an annular shoulder 22. The bore 21 causes the thickness of the metal adjacent the shoulder 22 to be reduced and consequently forms a relatively thin cylindrical wall 23. The head 15 is arranged within the enlarged bore 21 so that the inner face of the marginal part 17 fits and abuts against the shoulder 22. The diameter of the head 15 is such that the periphery of the marginal portion 17 fits snugly against the thin or weakened wall 23. The portion of said wall 23 that extends outwardly of the marginal portion 17 is beaded over or rolled inwardly as at 24 to clamp said portion 17 against the shoulder 22. The inrolled part of the wall 23 fits within the recess 19 and the edge thereof abuts against the shoulder 20, as shown in Figure 4, to form a supplemental seal. By clamping the head in place in this manner leakage or exudation of the grease around the marginal portion of said head is effectively avoided. In addition, the wall 23 and shoulder 22 exemplify means of an improved character whereby the head is held in its operative position by a minimum amount of metal. A characteristic of bulging the central portion 16 outwardly is that the head embodies a maximum amount of rigidity and operates to protect the marginal clamping parts against blows and resultant injury.

The central portion 16 of the head is punched or struck inwardly to form a cylindrical or tubular boss 25. The bore of this boss is formed with a female screw thread 26 for connection to the externally threaded nipple 27 at one end of a flexible discharge conduit 28. An advantage of forming the boss 25 so that it extends inwardly instead of outwardly is that it is completely housed and consequently protected against injury. The distal end of the conduit 28, is provided with a quickly detachable coupling 29 which is quickly connectible to suitably formed fittings or cups, as well understood in the art.

The pump herein disclosed may be manufactured at a low cost, is extremely light in that no casting or solid metal head is used to close the discharge end of the barrel, and embodies means of an improved character for securing the discharge-head in place.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A grease pump comprising a cylindrical barrel formed of a tubular piece of metal, one end of said barrel being bored to form an annular shoulder and a comparatively thin wall, a circular head for closing said one end of the barrel, the marginal portion of the head being arranged against the annular shoulder and connected to the central portion by an offset part so as to form an annular recess on the outer face of the head, the outer end of the aforesaid wall being rolled inwardly and fitting in the recess to secure said marginal portion of the head in its operative position against the shoulder, means for closing the other end of the barrel, and a piston slidably mounted in the barrel and operable to force grease therefrom.

2. A grease pump comprising a cylindrical barrel formed of a tubular piece of metal, one end of said barrel being bored to form an annular shoulder and a comparatively thin wall, a circular head for closing said one end of the barrel, said head being stamped from a single disk of metal and consisting of an outwardly bulged central portion, a radially extending marginal portion and an offset part between and connecting said marginal and central portions, said head being formed and arranged so that the marginal portion thereof abuts against the shoulder, the outer end of the aforesaid wall being rolled inwardly and fitting against the offset part to secure said marginal portion of the head in its operative position against the shoulder, means for closing the other end of the barrel, and a piston slidably mounted in the barrel and operable to force grease therefrom.

Signed at Chicago, Illinois, this 8th day of June, 1928.

WILLARD F. CLARK.